(12) United States Patent
Kiso et al.

(10) Patent No.: US 6,604,392 B1
(45) Date of Patent: Aug. 12, 2003

(54) CYLINDER LOCK DEVICE

(75) Inventors: Toshikazu Kiso, Yokohama (JP); Takashi Yoshizawa, Yokohama (JP)

(73) Assignee: Alpha Corporation, Kanagawa-pref. (JP)

( * ) Notice: Subject to any disclaimer, the term of this patent is extended or adjusted under 35 U.S.C. 154(b) by 0 days.

(21) Appl. No.: 09/466,581

(22) Filed: Dec. 17, 1999

(30) Foreign Application Priority Data

Dec. 28, 1998 (JP) .......................... 10-373837

(51) Int. Cl.⁷ .......................... B60R 25/02; G05G 5/00
(52) U.S. Cl. .......................... 70/186; 70/370; 70/371; 70/367
(58) Field of Search .......................... 70/182–189, 370, 70/371, 367, 369, 368, 379 R, 380

(56) References Cited

U.S. PATENT DOCUMENTS

| | | | |
|---|---|---|---|
| 3,686,906 A | | 8/1972 | Watkins et al. |
| 4,759,204 A | * | 7/1988 | Neyret ........................ 70/360 |
| 5,186,031 A | * | 2/1993 | Janssen et al. ................ 70/277 |
| 5,214,982 A | * | 6/1993 | Shieh ........................... 74/575 |
| 5,765,417 A | * | 6/1998 | Bolton ......................... 70/495 |
| 5,884,512 A | * | 3/1999 | Wayne ......................... 70/370 |
| 6,058,751 A | * | 5/2000 | Dimig et al. .................. 70/419 |

FOREIGN PATENT DOCUMENTS

JP        09 112099 A    *  4/1997

* cited by examiner

*Primary Examiner*—Anthony Knight
*Assistant Examiner*—John B. Walsh
(74) *Attorney, Agent, or Firm*—Bachman & LaPointe, P.C.

(57) ABSTRACT

A casing 20 of a cylinder lock device comprises two pieces of a rear casing 13 for receiving a rotor 22 and a front casing 14 for receiving a key cylinder 21 and a housing 24. The key cylinder and a rotor axially move and rotate upon insertion of a proper key 19 into the key cylinder 21 and subsequent rotation of the key 19. In assemblage of the cylinder lock device, the rotor 22 and key cylinder 21 are connected by a joint means 15 of non-circular section for their integral rotation, and the rotor 22 is connected to the housing 24 by a connecting means 16 for their integral rotation and axial movement. The front casing 14 can detachably be connected to the rear casing 13 by the coupling means 17.

10 Claims, 5 Drawing Sheets

CYLINDER LOCK DEVICE

FIELD OF THE INVENTION

The present invention relates to a locking device, in particular to a cylinder locking device which may be assembled by connecting a parted casing into two pieces.

DESCRIPTION OF THE PRIOR ART

Japanese Patent Disclosure No. 9-112099 shows a steering column shaft locking device with small number of structural components wherein a key cylinder axially moves in a casing by insertion of a key into the key cylinder to detect insertion of the key and surely move a locking rod to a locked position when the key is drawn out of the key cylinder. This steering column shaft locking device comprises a housing disposed in the casing for axial movement; the key cylinder positioned in a cavity formed in the housing for rotation and axial movement; tumblers slidably positioned in slits formed in the key cylinder to project into tumbler grooves formed in the housing; a housing spring for resiliently urging the housing toward a cover secured to the front portion of the casing; a rotor connected to the key cylinder; a hanger drivingly connected to a cam rotated with the rotor; a hanger spring for resiliently urging the hanger toward a locked position; a locking rod movable between locked and unlocked positions; and a pin protruding from the hanger. When the key cylinder is rotated with a proper key, the hanger and locking rod are moved from the locked-;position to the unlocked position while an edge of the rotor pushes the pin inwardly.

Japanese Utility Model Publication No. 55-8675 discloses an anti-theft device for an automobile which comprises a housing; a casing located in the housing; a key cylinder rotatably mounted in the casing; a flange member formed with an aperture; a latch engageable with a dent formed on an inner cylindrical surface of the housing; and a slider movable in the housing. In this anti-theft device, the key cylinder, flange member, latch and slider are mounted in the casing to form an assembly, and the assembled casing is then inserted into the housing. At the same time, the latch is put into the housing, passing over an inclined inner surface formed at an inlet of the housing so that the latch is automatically brought into engagement with the dent of the housing by one inserting operation. When the assembled casing is removed from the housing, a pin can be inserted into the housing through the aperture to move the latch away from the dent by the pin for detachment of the latch, and then the assembled casing can be pulled out of the casing for exchange or repair.

Japanese Utility Model Disclosure No. 55-22223 shows a steering column shaft locking device which comprises a cylinder lock having an axially movable rotor in a casing; a cam formed with the rotor; a hanger operatively connected with the cam; and a locking rod connected with the hanger for locking and unlocking a steering column shaft; an ignition switch operated by rotation of the rotor; a ring disposed in a hole of the casing and formed with an arcuate groove; and a pin received within the groove for limiting an angular rotation range of the rotor and preventing detachment of the rotor. The ring of this locking device is formed with a protrusion on a middle of the groove to stop rotation of the rotor during the rotation. The casing is formed with a concavity in front of the protrusion of the ring. In assemblage, the cylinder lock can be inserted into the casing with the pin by one operation, and then in disassemblage, the cylinder lock can be removed from the casing by inwardly pushing the pin with a needle through the hole of the casing after rotation of the key cylinder to a specific angular position.

Plural kinds of cylinder locks are mounted on an automobile to lock a steering column shaft, doors, trunk lid, and glove box lid, and a same key code is given to these cylinder locks to operate them with a single key for management and operation of the cylinder locks as a key set.

In this case, it is very complicated and troublesome to exactly manage a steering column shaft locking device as a key set because it is attached to a steering column in an assembling process of the steering system independently from attachment of other locking devices to the doors and trunk lid. In other words, the steering column shaft locking device is defective in that it cannot be mounted on the steering column in a coincident process including simultaneous attachment of the other locking devices to the doors and trunk lid.

An attempt has been made to solve this problem, as proposed for example by Japanese Utility Model Publication No. 55-8675 and Japanese Utility Model Disclosure No. 55-22223, which demonstrate steering column shaft locking devices wherein the frame with the locking rod can previously mounted to the steering column to attach locking structures to the frame later. However, the steering column shaft locking device of the type shown by Japanese Patent Disclosure No. 9-112099 has its particular structure of the key cylinder and rotor which are axially movable and rotatable as an integration in response to insertion and rotation of a key inserted into the key cylinder, and consequently it cannot adopt such a divided structure to previously mount the frame with the locking rod to the steering column shaft and then attached the cylinder lock to the frame in a later stage so as to accomplish the axial and rotative movements of the key cylinder.

Accordingly, an object of the present invention is to provide a cylinder locking device which may be assembled by connecting a casing divided into two pieces and a housing for axial and rotative movements of a key cylinder and a rotor together in response to the key operation.

SUMMARY OF THE INVENTION

The cylinder lock device according to the present invention includes a casing (20); a housing (24) disposed in the casing (20) for axial movement of the housing (24); a key cylinder (21) disposed in the casing (20) for rotation with a key (19); and a rotor (22) having a cam (23) and connected to the key cylinder (21) for their integral rotation. The casing (20) comprises a rear casing (13) for receiving the rotor (22), and a front casing (14) for receiving the key cylinder (21) and the housing (24). The cylinder lock device further comprises a joint means (15) of its non-circular section for connecting the rotor (22) and the key cylinder (21) for their integral rotation; a connecting means (16) for coupling the rotor (22) and the housing (24) for their integral axial movement and a coupling means (17) for securing the front casing (14) to the rear casing (13).

In assemblage, the rotor (22) is inserted into the rear casing (13), and the key cylinder (21) and the housing (24) are inserted into the front casing (14). Under the circumstances, when the key cylinder (21) is in a specific angular position such as an ACC position, the separated rear casing (13) and front casing (14) can be connected for releasable engagement by the coupling means (17) to prevent removal of the front casing (14) from the rear casing (13). When the key cylinder (21) is rotated with the key (19) from the specific angular position to any other position, the connecting means (16) serves to connect the housing (24) and the rotor (22) for their integral rotation and axial movement.

In an embodiment of the present invention, the connecting means (16) comprises a hook (30) formed with the housing (24), and an arcuate projection (31) formed with the rotor (22) so that the hook (30) of the housing (24) may engage with the arcuate projection (31). A notch (32) is formed in the arcuate projection (31) to move the hook (30) through the notch (32) in the specific angular position of the key cylinder (21) other than a locked position so that the connecting means (16) serves to connect the key cylinder (21) and the rotor (22) for their integral axial movement whenever the key cylinder (21) is in the locked position to draw the key (19) away from the key cylinder (21). The hook (30) may be engaged with the arcuate projection (31) of the rotor (22) when the key cylinder (21) is rotated from the specific angular position to another position.

In another embodiment of the present invention, a hook (30) of the connecting means (16) may have a claw (34) pivotally connected to the rotor (22), and a recess (21c) formed with the key cylinder (21). The hook (30) is rotatable through a notch (32) formed in the housing (24) to bring the claw (34) of the hook (30) into engagement with the recess (21c) in the specific angular position of the key cylinder (21) other than the locked position to draw the key (19) out of the key cylinder (21). The housing (24) can be axially moved and cover the hook (30) to prevent rotation of the hook (30) away from the recess (21c) when the key cylinder (21) is rotated from the specific angular position to another position.

The coupling means (17) comprises a stem (35) disposed in a hole (14a) radially formed in the front casing (14), and a stem spring (36) disposed in the hole (14a) for radially outwardly urging the stem (35). An outer end of the stem (35) can releasably be engaged with an outer hole (37) radially formed in the rear casing (13) because the stem (35) may be positioned in an inner hole (21b) radially formed in the key cylinder (21) in the specific angular position such as the ACC position other than the locked position when the stem (35) in the outer hole (37) is pushed inwardly against resilient force of the stem spring (36). Thus, when the key cylinder (21) is rotated to the specific angular position other than the locked position, the inner hole (21b) is registered with the stem (35), and the notch (32) comes into alignment with the hook (30). When the key cylinder (21) is not rotated to the ACC position, no alignment of the inner hole (21b) and the stem (35) can be performed to prevent removal of the front casing (14) from the rear casing (13). After the key cylinder (21) is rotated to the ACC position, the stem (35) can be pushed inwardly into the inner hole (21b) with some tool to release the engagement of the front casing (14) with the rear casing (13). When the front casing (14) is removed from the rear casing (13), the hook (30) can come over the notch (32) to disengage between the rotor (22) and the key cylinder (21) for separation of the front casing (14) from the rear casing (13).

In an embodiment of the present invention applied for a steering column shaft locking device, the cylinder lock device further comprises a locking rod (18) movable toward and away from a steering column shaft, a hanger (40) connected to the locking rod (18) for integral movement between locked and unlocked positions during rotation of the rotor (22) with the cam (23), a hanger spring (41) for resiliently urging the hanger (40) toward the locked position, and a pin (42) retractably protruding from the hanger (40). When the key (19) is inserted into the key cylinder (21), it causes the rotor (22) to move back against elastic force of a housing spring (28) which resiliently forwardly urges the housing (24) so that the rotor (22) pushes the pin (42) inside the hanger (40).

In other words, when the key (19) is inserted into the key cylinder (21), the housing (24), the key cylinder (21) and the rotor (22) are axially and inwardly moved against elastic force of the housing spring (28). Then, with rotation of the key cylinder (21), the rotor (22) is rotated with the key cylinder (21) between the locked and unlocked positions.

When the key (19) is pulled out of the key cylinder (21), the housing (24) and the key cylinder (19) are axially and forwardly moved by elastic force of the hanger spring (41). At the same time, the rotor (22) is axially and forwardly moved with the key cylinder (19) through the connecting means (16). Thus, the coupling means (17) can connect the separated rear casing (13) and front casing (14), and the connecting means (16) can connect the rotor (22) with the housing (24) so that the rotor (22) can axially be moved and rotated with the key cylinder (21) to lock or unlock a controlled object by the rotation of the rotor (22).

DETAILED DESCRIPTION OF THE INVENTION

Referring to FIGS. 1 to 12, embodiments are described hereinafter of a cylinder lock device according to the present invention applied to a steering column shaft locking device.

Figure 1:
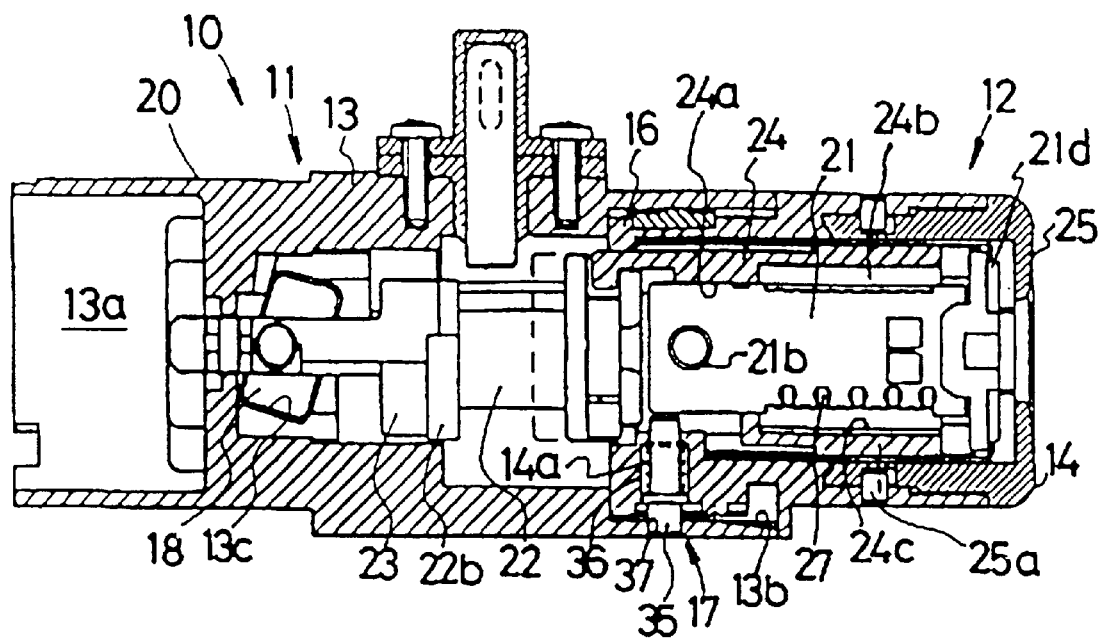
FIG. 1 is a cross-sectional view taken along a line I—I of FIG. 3 showing a cylinder lock device applied to a steering column shaft locking device.

As shown in FIG. 1, a steering column shaft locking device 10 according to the present invention includes a casing 20 which comprises a rear casing 13 to form a casing unit 11 and a front casing 14 to form a cylinder unit 12. A rotor 22 is formed with a cam 23 disposed in the rear casing 13 to operatively connect a key cylinder 21 to an ignition switch (not shown) in a hollow 13a of the rear casing 13.

Figure 5:
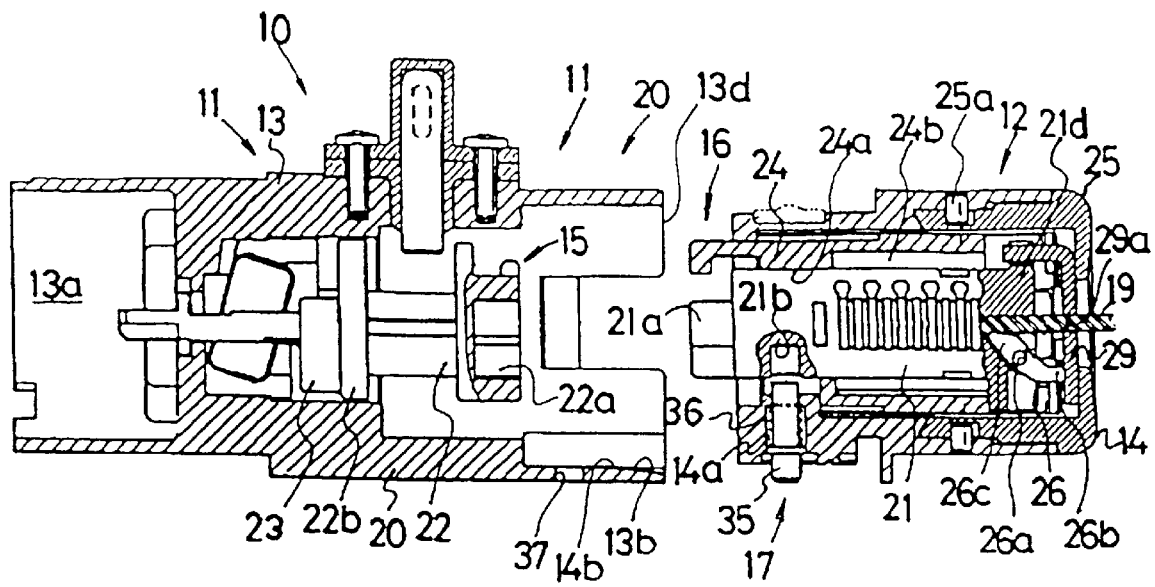
FIG. 5 is a cross-sectional view of a casing unit and a cylinder unit before assemblage.
Figure 6:
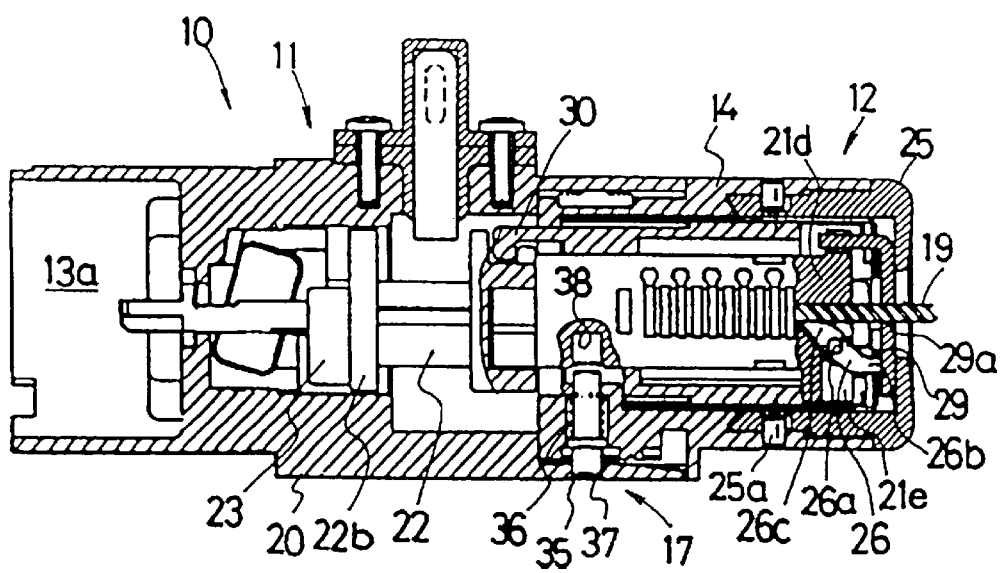
FIG. 6 is a cross-sectional view of the connected casing unit and cylinder unit.

The steering column shaft locking device 10 includes the key cylinder 21 disposed in the front casing 14 for rotation and axial movement with a key 19 (FIGS. 5 and 6). A cover 25 is secured to the front end of the front casing 14 to locate the key cylinder 21 in position. Rotatably mounted to the front of the key cylinder 21 is a key detecting lever 26 which can also be pivoted around a pair of spindles 26a formed with the key detecting lever 26 by insertion of the key 19 into the key cylinder 21 to apply reaction force against the cover 25 and move the key cylinder 21 away from the cover 25. A housing 24 is slidably disposed in the front casing 14 for axial movement between outer and inner positions in the front casing 14. The housing 24 is formed with a cavity 24a to receive the key cylinder 21 for rotation and axial movement and with tumbler grooves 24b into which tumblers 27 of the key cylinder 21 can protrude for locking. A housing spring 28 (FIG. 2) is disposed between the front casing 14 and housing 24 to resiliently urge the housing 24 toward the cover 25. A guard plate 29 is located between the cover 25 and the key cylinder 21 to prevent impermissible destruction of the locking device and to block illegal insertion of some tool into a key hole of the key cylinder 21. The guard plate 29 is formed of hard metal into a semicircle shape with an opening 29a into which the key 19 is inserted, and is rotatably disposed with the inserted key without axial movement.

Figure 7:
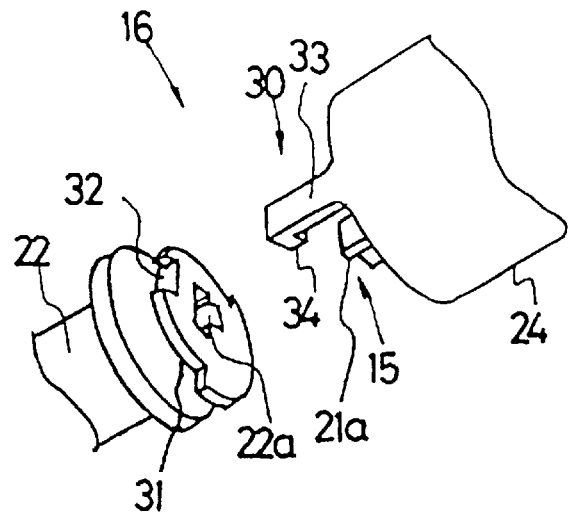
FIG. 7 is a perspective view showing a main part of a connecting means.

As shown in FIGS. 5 and 7, a joint means 15 of non-circular section comprises a rear protrusion 21a of the generally T-shaped section of the key cylinder 21; and a joint hole 22a of the rotor 22 to receive the rear protrusion 21a in the joint hole 22a which has the complementary cross-section to the rear protrusion 21a so that the joint means 15 can connect the rotor 22 and the key cylinder 21 for integral rotation after the cylinder unit 12 is connected with the casing unit 11.

Figure 2:
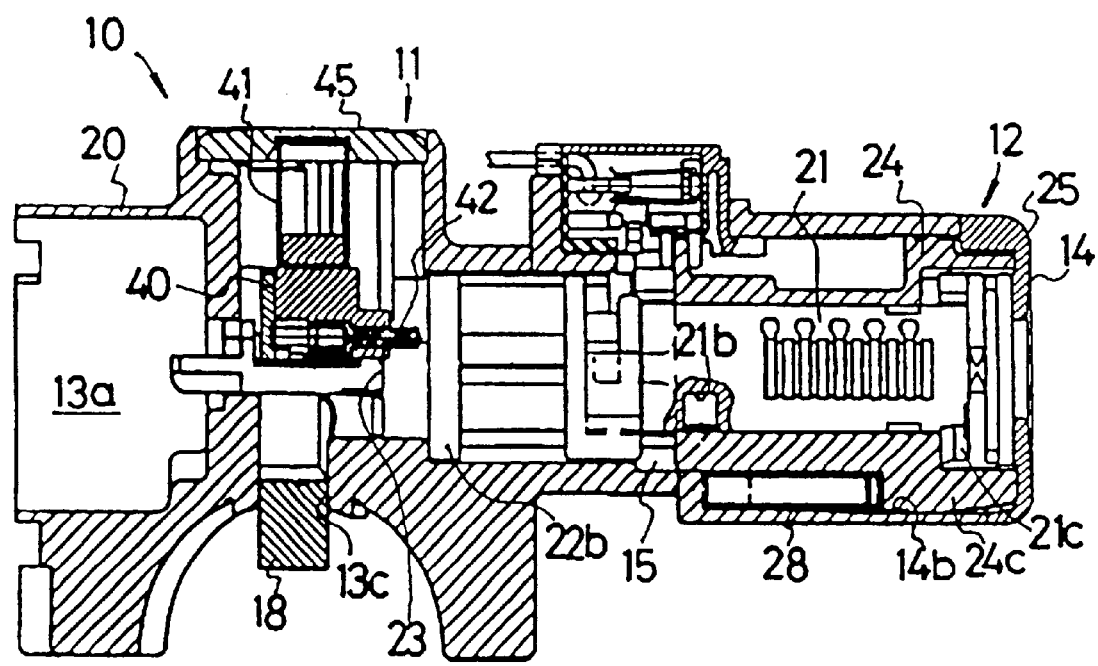
FIG. 2 is a cross-sectional view taken along a line II—II of FIG. 3.
Figure 3:
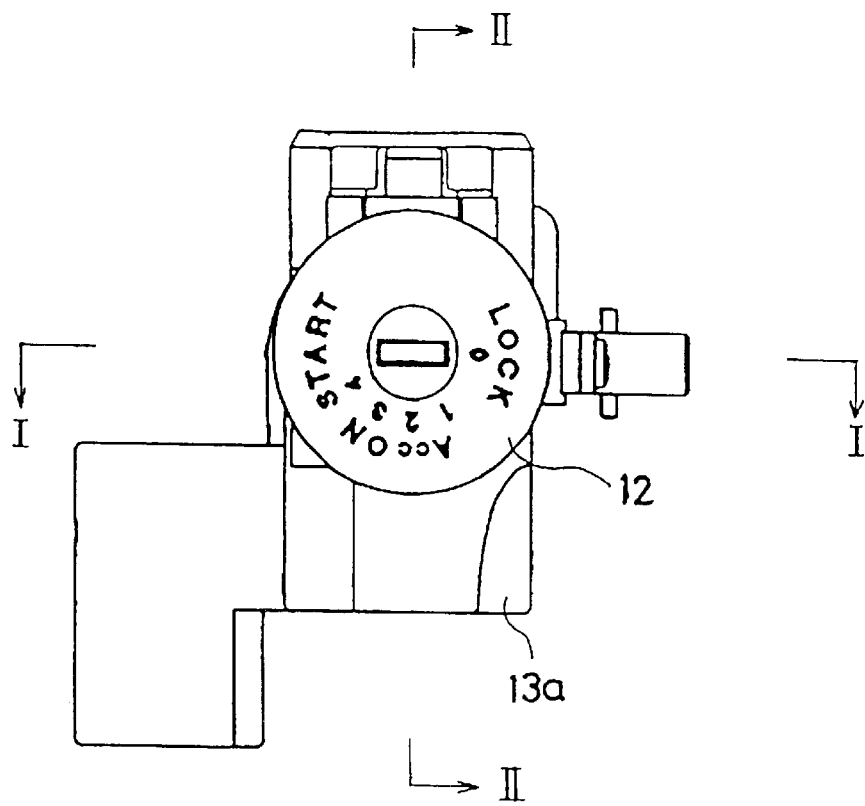
FIG. 3 is a front view of the steering column shaft locking device.
Figure 4:
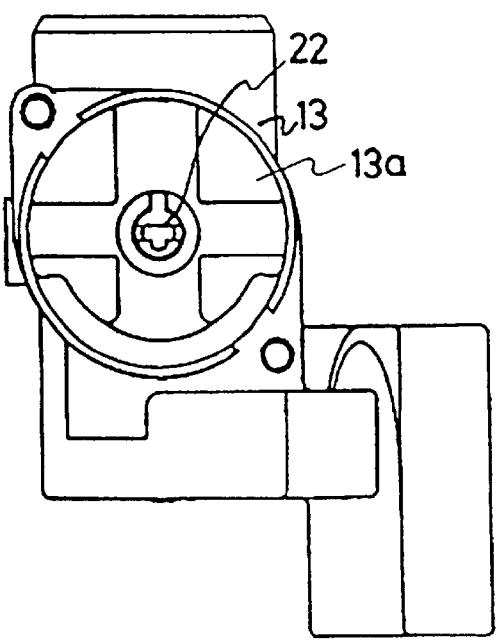
FIG. 4 is a back view of the steering column shaft locking device.

The key detecting lever 26 is disposed in a notch 21e formed in a flange 21c of the key cylinder 21 for pivotal movement around the spindles 26a supported on the flange 21c. The key detecting lever 26 has an outer end 26b and an inner end 26c respectively formed on the outside and inside of the spindles 26a. As shown in FIG. 2, the housing 24 includes a guide protrusion 24c projecting radially outward for axial movement in the front casing 14 between an outer position (FIGS. 1 and 2) and an inner position (FIGS. 5 and 6). A groove 14b is formed in the front casing 14 to receive the guide protrusion 24c and a housing spring 28 for resiliently urging the guide protrusion 24c toward the cover 25 in the axial direction. The housing 24 can axially move with the guide protrusion 24c in the groove 14b without rotation upon insertion of the key 19 into the key hole in the key cylinder 21.

As shown in FIG. 7, the connecting means 16 comprises a hook 30 formed with the housing 24, and an arcuate projection 31 formed with the rotor 22 for engagement of the hook 30 with the arcuate projection 31. The hook 30 has an arm 33 axially extending from the housing 24 and a claw 34 formed at the tip of the arm 33 to project radially inward. Formed in the arcuate projection 31 is a notch 32 through which the claw 34 of the hook 30 can pass when the key cylinder 21 is in the specific angular position such as an ACC position other than the locked position. Thus, after the claw 34 passes through the notch 32 in the axial direction, the rotor 22 can be rotated for engagement of the claw 34 with the arcuate projection 31 of the rotor 22. The hook 30 can pass through the notch 32 when the key cylinder 21 is in the specific angular position for example the ACC position. However, the claw 34 of the connecting means 16 is very effective to surely connect the rotor 22 and key cylinder 21 for integral axial movement whenever the key cylinder 21 is in another position than the ACC position for example the locked position to draw the key 19 away from the key cylinder as shown in a "LOCK" position of FIG. 8.

A coupling means 17 comprises a stem 35 disposed in a hole 14a radially formed in the front casing 14, and a stem spring 36 disposed in the hole 14a for radially outwardly urging the stem 35 to connect the cylinder unit 12 to the casing unit 11. The rear casing 13 is formed with a slope 13b extending inward from an inlet 13d and an outer hole 37 radially formed in the rear casing 13. The stem 35 and stem spring 36 are retained in the radial hole 14a formed in the front casing 14 in the condition of the stem 35 outwardly urged by the stem spring 36. The outer end of the stem 35 partly extends out of the radial hole 14a and is movable inwardly against resilient force of the stem spring 36 when an external force is applied on the stem 35. The inner end of the stem 35 may extend out of the radial hole 14a to come into an inner hole 21b of the key cylinder 21 when it is in the ACC position. Accordingly, the stem 35 can be latched within the outer hole 37 after passage through the slope 13b for optional attachment and detachment.

Figure 9:
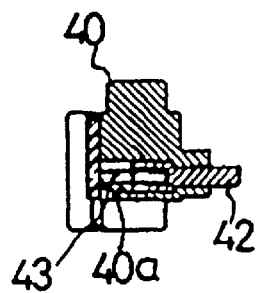
FIG. 9 is a cross-sectional view of a hanger.
Figure 10:
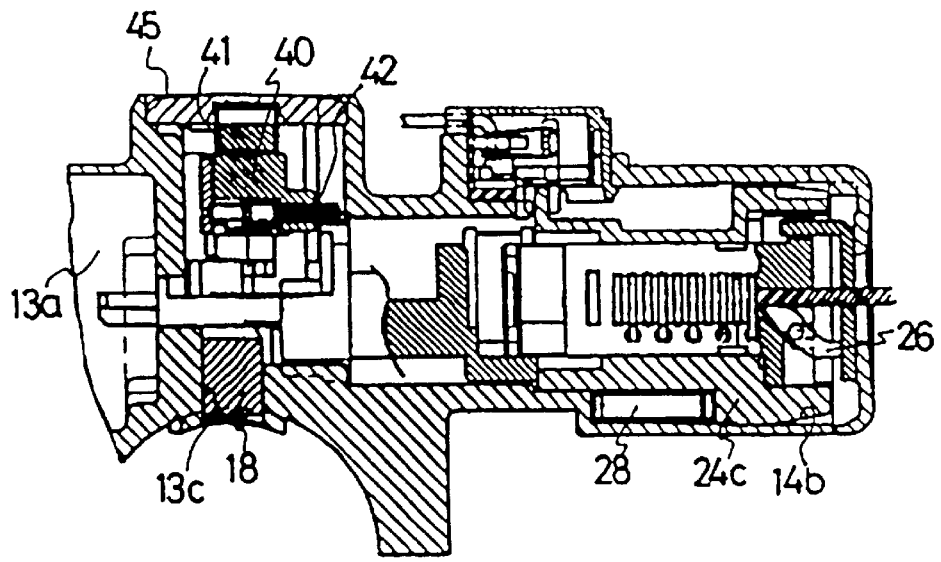
FIG. 10 is a cross-sectional view of the steering column shaft locking device with a key cylinder in an unlocked position.

As shown in FIGS. 1 and 2, a locking rod 18 is slidably disposed within an opening 13c formed in the rear casing 13. As understood by those skilled in the art, the locking rod 18 can be moved into and away from a concavity of the steering shaft (not shown) for locking and unlocking upon forward and adverse rotation of the key cylinder 21 with the proper key. Moreover, as self-explanatory to the skilled in the art, a hanger 40 is drivingly connected to the locking rod 18 for movement between locked and unlocked positions during rotation of the rotor 22 with the cam 23. A lid 45 is secured on an upper part of the rear casing 13, and a hanger spring 41 is disposed between the lid 45 and hanger 40 for resiliently urging the hanger 40 toward the locked position. As shown in FIG. 9, the hanger 40 has a through hole 40a where a pin 42 and a pin spring 43 are provided to resiliently urge the pin 42 toward a flange 22b formed on the rotor 22 by the pin spring 43. The pin 42 extends from the hanger 40 by elastic force of the pin spring 43 to contact the flange 22b of the rotor 22. A similar structure to the hanger 40 and pin 42 is mounted in a conventional steering column shaft locking device as disclosed in Japanese Patent Disclosure No. 9-112099, and hence detailed description thereon is omitted herein.

In assemblage, as shown in FIG. 5, the rotor 22, hanger 40, hanger spring 41 and locking rod 18 are inserted into the rear casing 13, while the housing 24, key cylinder 21, key detecting lever 26, stem 35, stem spring 36 and guard plate 29 are inserted into the front casing 14 without the cover 25. Then, after securing the cover 25 to the front casing 14, a pin 25a is riveted to secure the cover 25 to the front casing 14, and the inserted parts are held in position of the front casing 14 to form the single cylinder unit 12 for easy handling. For example, the rear casing 13 can be previously attached to the steering column shaft of an automobile. In this situation, the proper key 19 is inserted into the key cylinder 21 and rotated to the ACC position together with the key cylinder 21 and rotor 22.

When the rear casing 13 and front casing 14 are in alignment with each other, the front casing 14 can be coupled with the rear casing 13. At this moment, the stem 35 contacts the slope 13b of the rear casing 13 and is pushed radially inward by the slope 13b against elastic force of the stem spring 36. In this case, as the key cylinder 21 is in the ACC position, the inner end of the stem 35 is registered with the inner hole 21b of the key cylinder 21. After the stem 35 fully moves radially inward, the outer end of the stem 35 is brought into engagement with the outer hole 37 by elastic force of the stem spring 36 to mechanically combine the cylinder unit 12 and casing unit 11 with the coupling means 17.

Figure 8:
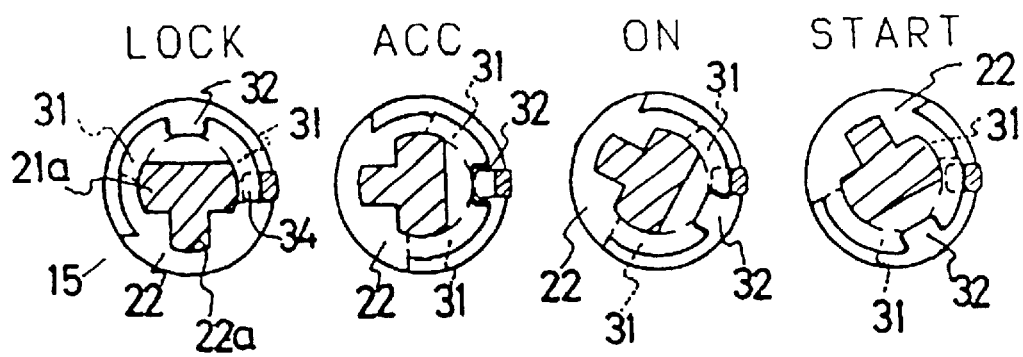
FIG. 8 is a cross-sectional view of a rotor rotated in four angular positions relative to a hook.

In the "ACC" position of FIG. 8 the claw 34 formed at the tip of the arm 33 is in alignment with the notch 32 so that when the front casing 14 is coupled with the rear casing 13, the claw 34 can axially move and pass through the notch 32. When the key cylinder 21 and rotor 22 are rotated with the key 19 to the "LOCK", "ON" or "START" position of FIG. 8 other than the ACC position, the claw 34 is engaged with the arcuate projection 31 of the rotor 22 to accomplish the mechanical connection of the rotor 22 to the key cylinder 21 by the connecting means 16 for integral axial movement. In these positions other than the ACC position, the stem 35 cannot be pushed because the inner end of the stem 35 contacts the outer surface of the key cylinder 21 off from the inner hole 21b to prevent removal of the front casing 14 from the rear casing 13.

In this way, when the key cylinder 21 is in the only ACC position, the rear casing 13 and front casing 14 can be connected and disconnected.

When the key cylinder 21 is rotated with the key 19 in the coupled condition, the rotor 22 can be rotated with the key cylinder 21 through the joint means 15 of non-circular section, and the rotor 22 can be axially moved with the key cylinder 21 through the connecting means 16.

After assembling the rear casing 13 and front casing 14, as shown in FIGS. 5 and 6, the key 19 is inserted into the key cylinder 21 in the LOCK position, and then contacts in the inner end 26c of the key detecting lever 26 which is therefore rotated around the spindles 26a, while the outer end 26b of the key detecting lever 26 urges the guard plate 29. Simultaneously, the key cylinder 21, housing 24 and rotor 22 are forcibly moved axially and inwardly against elastic force of the housing spring 28 so that the pin 42 is rotated by contact with the flange 22b of the rotor 22 against elastic force of the pin spring 43. Otherwise, the housing 24 may be moved by virtue of the engagement between the arcuate projection 31 and hook 30.

In this situation, when the key 19 is rotated from the LOCK position through the ACC position to the unlocked position, the hanger 40 is moved upwardly by rotation of the cam 23 of the rotor 22 against resilient force of the hanger spring 41, and the locking rod 18 is moved from the locked position (FIG. 2) to the unlocked position (FIG. 10) to release engagement with the steering shaft. As a result of a further rotation of the key cylinder, to the ON position, the ignition switch (not shown) is turned ON, and then the pin 42 protrudes from the hanger 40 by elastic force of the pin spring 43 to engage with the periphery of the flange 22b of the rotor 22 and hold the locking rod 18 in the unlocked position until the key 19 is pulled out of the key cylinder 21.

An engine of the automobile can be started by rotating the key cylinder 21 with the key 19 to the START position, and then the key 19 is returned to and kept in the ON position. When the steering column shaft is locked, the key cylinder 21 is rotated until the key 19 from the ON position through the ACC position to the LOCK position. When the key 19 is pulled away from the key cylinder 23 in the LOCK position, the inner end 26c of the key detecting lever 26 is released from engagement with the key 19 to protrude into the key hole of the key cylinder 21, and accordingly the housing 24 and key cylinder 21 are axially moved forward to the initial position shown in FIGS. 1 and 2 by elastic force of the housing spring 28. Thus, the locking device is characterized in that when the key 19 is drawn away from the key cylinder 21, the housing spring 28 causes the key cylinder 21, housing 24 and rotor 22 to axially move toward the cover 25 with pivotal movement of the key detecting lever 26. Simultaneously, the rotor 22 is also axially moved due to the connection to the housing 24 through the connecting means 16, and the flange 22b of the rotor 22 moves away and is disconnected from the pin 42 so that the hanger 40 and locking rod 18 are resiliently urged from the unlocked to the locked position by elastic force of the hanger spring 41.

In this way, the coupling means 17 separably connects the parted rear casing 13 and front casing 14, and the connecting means 16 can separably connect the rotor 22 and housing 24. Therefore, upon axial movement of the housing 24, the rotor 22 is also coincidently axially moved together with the key cylinder 21. In addition, upon rotation of the key cylinder 21, the rotor 22 is concurrently rotated with the key cylinder 21 to unlock or lock the controlled object.

In case the front casing 14 is removed from the rear casing 13, the proper key 19 is inserted into the key cylinder 21 to rotate it to the ACC position, and then the stem 35 is urged radially inward with some tool against resilient force of the stem spring 36 to release engagement between the stem 35 and engaging hole 37. When the stem 35 is urged inwardly from the outer hole 37 against elastic force of the stem spring 36, the stem 35 radially enters the inner hole 21b of the key cylinder 21 in the specific angular position other than the locked position to draw the key 19 out of the key cylinder 21. Thus, when the key cylinder 21 is rotated to the specific angular position such as the ACC position other than locked position, the inner hole 21b is registered with the stem 35, and the notch 32 comes into alignment with the hook 30. In this situation, the front casing 14 is easily moved away from the rear casing 13 because the hook 30 is passed through the notch 32 for disengagement from the arcuate projection 31.

When the key cylinder 21 is not rotated to the ACC position, the inner hole 21b is out of alignment from the stem 35 to thereby prevent the detachment of the front casing 14 from the rear casing 13. After the key cylinder 21 is rotated to the ACC position, the stem 35 can be pushed inward into the inner hole 21b for example by a pin to release the engagement of the front casing 14 with the rear casing 13. When the front casing 14 is removed from the rear casing 13, the hook 30 can pass the notch 32 to release the engagement between the rotor 22 and key cylinder 21 for separation of the front casing 14 from the rear casing 13.

Figure 11:
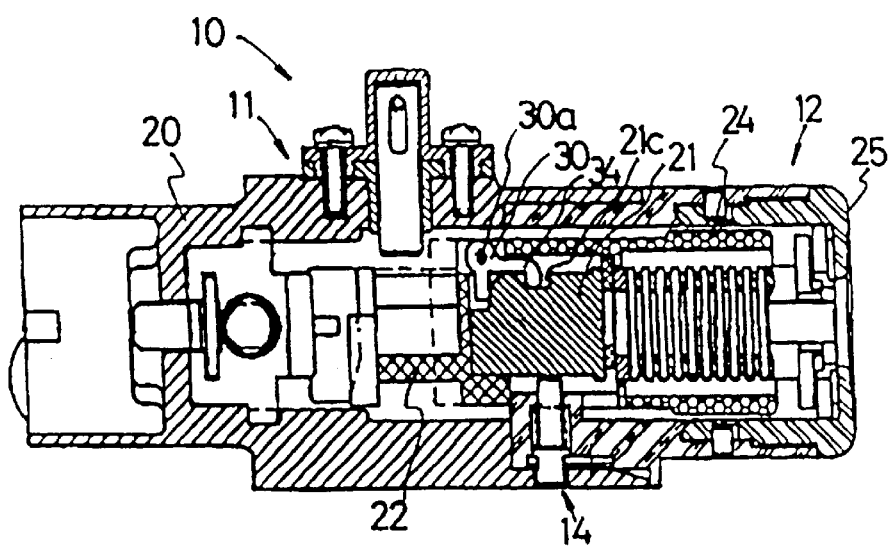
FIG. 11 is a cross-sectional view of another embodiment according to the present invention.
Figure 12:
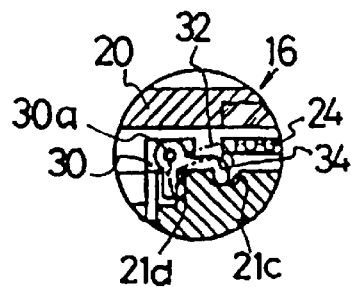
FIG. 12 is a cross-sectional view of the connecting means shown in FIG. 10 with the key cylinder rotated in an ACC position.

FIGS. 11 and 12 show another embodiment of the connecting means 16 according to the present invention, which comprises a hook 30 having a claw 34 pivotally connected to the rotor 22 around a pin 30a, and a recess 21c formed in the key cylinder 21 to engage with the claw 34. The hook 30 contacts a slope 21d adjacent to the recess 21c and rotates in the clockwise direction to radially pass through the notch 32 formed in the housing 24 and is automatically engaged with the recess 21c when the key cylinder 21 in the specific angular position is pushed toward the rotor 22. Similarly to the foregoing embodiment, the specific angular position is for example the ACC position other than the locked position to draw the key 19 out of the key cylinder 21. When the rotor 22 is rotated from the ACC position to the other position, the housing 24 covers the hook 30 to prevent detachment of the hook 30 from the recess 21c. As necessary, a spring may be provided to resiliently urge the hook 30 in the counterclockwise direction.

The embodiments of the present invention can show the following effects.

<1> The casing unit 11 and cylinder unit 12 can be divided into two pieces for easy handling as a key set.

<2> After the casing unit 11 without key code is previously mounted on a relative portion of a steering column shaft, the casing unit 11 can be mounted to the cylinder unit 12 in the later assembling process.

<3> The only cylinder unit 12 without the casing unit 11 can be handled as a key set together with cylinder lock devices for doors, trunk lid and glove box lid.

<4> A key set can be manufactured in small size and light weight.

<5> The cylinder unit 12 with a key code can be easily mounted on or removed from the casing unit 11 for exchange.

<6> When the cylinder unit 12 is coupled to the casing unit 11, the rotor 22 and key cylinder 21 are mechanically combined for their integral axial movement and rotation by operating the key 19.

<7> The connecting means 16 facilitates to connect the rotor 22 and key cylinder 21 because of passage of the hook 30 through the notch 32 after the key 19 is inserted into the key cylinder 21 and rotated to the specific angular position.

<8> The cylinder unit 12 cannot be removed from the casing unit 11 to provide a secure anti-theft mechanism once the key cylinder 21 is rotated with the key 19 from a certain position to the locked or unlocked position.

<9> The front casing 14 can certainly be attached to and detached from the rear casing 13 through the coupling means 17.

<10> The cylinder unit 12 can easily be separated from the casing unit 11 by pushing the stem 35 inwardly and axially moving the cylinder unit 12 away from the casing unit 11.

<11> The key cylinder 21 can easily be exchanged for new one when the key 19 is lost.

While the embodiments of the present invention are described hereinbefore as applied to a steering column shaft locking device, it would be apparent that the invention is applicable to cylinder lock devices of other types which can operate controlled objects by rotation of a rotor.

As described above, the present invention can provide a cylinder lock device to easily assemble and handle, because a parted casing unit and a housing unit can be assembled by mechanical connection, and a key cylinder and rotor can be connected for their integral axial movement and rotation when a proper key is inserted into the key cylinder.

What is claimed are:

1. A cylinder lock device comprising a casing;
   a housing disposed in said casing for axial movement of said housing;
   a key cylinder disposed in said casing for rotation with a key; and a rotor having a cam and connected to said key cylinder for their integral rotation, said casing comprising a rear casing for receiving said rotor to form a casing unit, and a front casing for receiving said key cylinder, said housing and a cover secured to said front casing to form a single cylinder unit;
   a joint means comprising a non-circular section for detachably connecting said rotor and key cylinder for their integral rotation;
   connecting means having a first position for coupling said housing and rotor for their integral axial movement and a second position for uncoupling said rotor and housing when said key cylinder is disposed in said casing;
   a coupling means for detachably securing said front casing to said rear casing,
   wherein said single cylinder unit is removably coupled with said casing unit through said joint means, connecting means and coupling means to connect said rotor and key cylinder for their integral rotation, couple said rotor and housing for their integral axial movement and secure said front casing to rear casing; and
   said key cylinder, housing and rotor are axially moved when said key is inserted into or pulled out of said key cylinder, and said key cylinder and rotor are rotated together with said key.

2. The cylinder lock device as claimed in claim 1, wherein said rear casing can be connected to said front casing when said key cylinder is in a specific angular position; and said connecting means couples said housing and rotor for their integral axial movement when said key cylinder is rotated with said key from said specific angular position.

3. The cylinder lock device as claimed in claim 2, wherein said connecting means comprises a hook formed with said housing, and an arcuate projection formed with said rotor with which said hook of said housing may engage; a notch formed in said arcuate projection for movement of said hook through said notch when said key cylinder is in said specific angular position other than a locked position to draw said key away from said key cylinder whereby said hook may be coupled with said arcuate projection of said rotor when said key cylinder is rotated from said specific angular position.

4. The cylinder lock device as claimed in claim 1, wherein said coupling means comprises a stem disposed in a hole radially formed in said front casing, and a stem spring disposed in said hole for radially outward urging said stem; and
   said cylinder unit is removed from said casing unit when said stem is urged radially inward against resilient force of said stem spring.

5. The cylinder lock device as claimed in claim 1, wherein said cylinder unit further comprises a key detecting lever pivoted around a pair of spindles formed with said key detecting lever, said key detecting lever applies reaction force against the cover to move the key cylinder away from the cover upon insertion of the key into the key cylinder.

6. A cylinder lock device as claimed in claim 1, wherein said connecting means includes means for positioning the housing in said rotor at a specific angular position for detaching said housing from said rotor.

7. A cylinder lock device comprising a casing;
   a housing disposed in said casing for axial movement of said housing;
   a key cylinder disposed in said casing for rotation with a key;
   a rotor having a cam and connected to said key cylinder for their integral rotation, said casing comprising a rear casing for receiving said rotor, and a front casing for receiving said key cylinder;
   a joint means of its non-circular section for connecting said rotor and key cylinder for their integral rotation;
   a connecting means for coupling said rotor and housing for their integral axial movement; and
   a coupling means for securing said front casing to said rear casing;
   said connecting means comprises hook having a claw and pivotally connected to said rotor, and a recess formed with said key cylinder; said hook rotatable through a notch formed in said housing to bring said claw of said hook into engagement with said recess when said key cylinder is in said specific angular position other than a locked position to pull said key out of said key cylinder; and said housing covering said hook to prevent rotation of said hook away from said recess when said key cylinder is rotated from the specific angular position;

wherein said key cylinder, housing and rotor are axially moved when said key is inserted into or pulled out of said key cylinder, and said key cylinder and rotor are rotated together with said key.

8. A cylinder lock device which includes a casing;

a housing disposed in said casing for axial movement of said housing;

a key cylinder disposed in said casing for rotation with a key;

a rotor having a cam and connected to said key cylinder for their integral rotation, said casing comprising a rear casing for receiving said rotor, and a front casing for receiving said key cylinder;

a joint means of its non-circular section for connecting said rotor and key cylinder for their integral rotation;

a connecting means for coupling said rotor and housing for their integral axial movement; and a coupling means for securing said front casing to said rear casing;

said coupling means comprises a item disposed in a hole radially formed in said front casing, and a stem spring disposed in said hole for radially outward urging said stem; an outer end of said stem being releasably engaged with an outer hole radially formed in said rear casing; and said stem being inserted into an inner hole radially formed in said key cylinder in said specific angular position other than the locked position to extract said key from said key cylinder when said stem is pushed inward in said outer hole against resilient force of said stem spring;

wherein said key cylinder, housing and rotor are axially moved when said key is inserted into or pulled out of said key cylinder, and said key cylinder and rotor are rotated tog ether with said key.

9. A cylinder lock device comprising a casing;

a housing disposed in said casing for axial movement of said housing;

a key cylinder disposed in said casing for rotation with a key;

a rotor having a cam and connected to said key cylinder for their integral rotation, said casing comprising a rear casing for receiving said rotor, and a front casing for receiving said key cylinder;

a joint means of its non-circular section for connecting said rotor and key cylinder for their integral rotation;

a connecting means for coupling said rotor and housing for their integral axial movement;

a coupling means for securing said front casing to said rear casing;

a locking rod movable toward and away from a steering column shaft;

a hanger connected to said locking rod for integral movement to an unlocked position during rotation of said rotor with said cam;

a hanger spring for resiliently urging said hanger toward a locked position;

a pin retractably extending from said hanger; and a housing spring for elastically and forwardly pushing said housing;

wherein said key cylinder, housing and rotor are axially moved when said key is inserted into or pulled out of said key cylinder, and said key cylinder and rotor are rotated together with said key;

said pin is retracted into said hanger when said rotor is moved back against pressure of said housing spring by insertion of said key into said key cylinder.

10. The cylinder lock device as claimed in any one of claims 1 to 8, further comprising a locking rod movable toward and away from a steering column shaft; a hanger connected to said locking rod for integral movement to an unlocked position during rotation of said rotor with said cam; a hanger spring for resiliently urging said hanger toward a locked position; a pin retractably extending from said hanger; and a housing spring for elastically and forwardly pushing said housing;

wherein said pin is retracted into said hanger when said rotor is moved back against pressure of said housing spring by insertion of said key into said key cylinder.

* * * * *